United States Patent [19]

Tomozawa

[11] 3,782,778
[45] Jan. 1, 1974

[54] BICYCLE WHEEL
[75] Inventor: Yoshiaki Tomozawa, Osaka, Japan
[73] Assignee: Nankai Tekko Co., Ltd., Osaka, Japan
[22] Filed: Mar. 10, 1972
[21] Appl. No.: 233,498

[30] Foreign Application Priority Data
   Mar. 11, 1971  Japan.................. 46/16344

[52] U.S. Cl............................ 301/9 DN, 301/63 DD
[51] Int. Cl............................................ B60b 19/00
[58] Field of Search................... 301/63 DD, 63 DT,
          301/63 DS, 64 SH, 63 PW, 6 A, 6 V, 59, 9
                                              DN, 114, 105 B

[56] References Cited
       UNITED STATES PATENTS
   516,398    3/1894   Moore............................ 301/63 DT
   1,305,820  6/1919   Macbeth........................ 301/63 DS
   1,479,417  1/1924   Leonard.......................... 301/63 DS
   2,994,560  8/1961   Carlson.............................. 301/59

FOREIGN PATENTS OR APPLICATIONS
   176,606    3/1922   Great Britain.................. 301/63 DS
   366,551    7/1906   France........................... 301/63 DD Primary Examiner—Richard J. Johnson
Assistant Examiner—Reinhard J. Eisenzopf
Attorney—James E. Armstrong

[57]                ABSTRACT

An improved bicycle wheel with isometrical disc wheels linked together with bosses at the bases fitted to a coaster hub shell with cylindrical bodies adjacent to the waster hub shell, a flange on the shell jointed to one boss with bolts extending through the jointed shell flange and boss and an opposite boss.

5 Claims, 3 Drawing Figures

BICYCLE WHEEL

BACKGROUND OF THE INVENTION

This invention relates to a bicycle wheel, and more particularly to an improved bicycle wheel wherein a pair of isometrical disc wheels, which are linked together in the form of an arch, are fitted to a coaster hub shell, so that they may easily be attached to the coaster hub shell or detached from it.

It is an object of this invention to permit and provide for inexpensive replacement of the disc wheels or the coaster hub shell instead of exchanging the wheel itself for a new one if the wheel is damaged in either the disc wheel or coaster hub shell. Replacement is possible because both the disc wheels and coaster hub shell are exchangeable, since the disc wheels can easily be attached to the coaster hub shell or detached from it.

It is a further object of this invention to prevent the linked portion of the disc wheels from being disjoined.

Other objects and advantages of the present invention will be apparent from the following description taken in conjunction with the accompanying drawings.

SUMMARY OF THE INVENTION

In general summation, the invention consists of an improved bicycle wheel comprised of a central coaster hub shell and adjacent jointed cylindrical bodies. Disc wheels which are linked together in the form of an arch with bosses at the respective bases of the arch which rest upon the cylindrical bodies. The coaster hub shell is provided with a flange jointed to the outside of one boss with fastening members passing through the flange and jointed boss and an opposite boss, to unite the entire structure into a single unit.

DETAILED DESCRIPTION OF THE DRAWINGS

Figure 1:
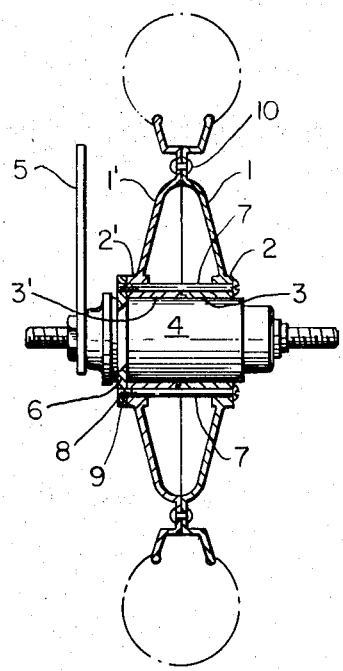
FIG. 1 is a longitudinal sectional view of a bicycle wheel illustrating one application of the present invention.
Figure 2:
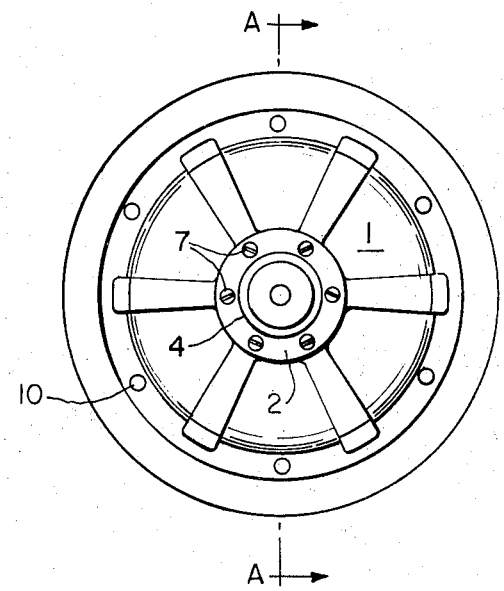
FIG. 2 is a side elevation of the above.

Referring now to the drawings in detail, a pair of isometrical disc wheels 1, 1' are linked together in the form of an arch. At the bases of the arch are thick bosses 2, 2'. Cylindrical bodies 3, 3' are jointed in the inside stair-shaped tip near their vertical axis. This is the wheel body structure, and the coaster hub shell 4 is inserted in the jointed cylindrical body. The coaster hub shell is provided with a flange 6 at the side of a coaster arm 5, and said flange is jointed to the outside of one boss 2'. At the same time, from the outside of the other boss several bolts 7 pass through the bosses 2, 2' of the disc wheels 1, 1' and a male screw 8 at the bolt tip is screwed in a female screw 9 of the flange, so that the disc wheels and coaster hub shell are united in a monoblock or single unit relation. Furthermore, the disc wheels are riveted in parts, as at 10. Also, the coaster hub shell is provided with a coaster brake therein.

The present invention prevents the linked disc wheels from opening and separating, which can result from load on the tire. Separation is prevented by the bolts 7 which pass through the bosses 2, 2' of the disc wheels from the outside of the boss 2, and the male screw 8 at the bolt tip which is screwed in the female screw of the flange 6 to keep the disc wheels securely linked. In addition, the present invention simplifies the replacement of the disc wheel or the coaster hub shell when either of them is damaged, thereby allowing economical repair since the disc wheel and coaster hub shell united by the use of the bolts alone can be easily both separated and re-united.

Figure 3:
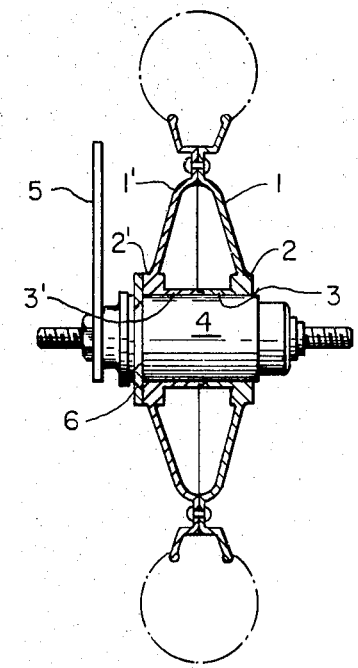
FIG. 3 is a sectional view taken along line A—A of FIG. 2.

As best illustrated in FIG. 3, the cylindrical bodies 3, 3' project inwardly from the respective bosses 2, 2' and meet such as to be jointed in the form of a stair-step shaped tip near their vertical axis. The cylindrical bodies 3, 3' and the bosses 2, 2' are thus formed as one body.

While only a single embodiment of this invention has been shown and described, it is readily apparent that many changes may be made therein without departing from the scope of this invention as defined by the following claims.

What is claimed is:

1. A bicycle wheel comprised of a pair of wheel discs which are linked together, said wheel discs having bosses which are fitted to a coaster hub shell, said shell being provided with a flange jointed to the outside of one boss, with fastening means passing through the bosses and into the flange.

2. A bicycle wheel according to claim 1, wherein the wheel discs are isometrical and arranged in the form of an arch with a boss formed at each base of the arch.

3. A bicycle wheel according to claim 1, wherein jointed cylindrical bodies are interposed between the bosses and the coaster hub shell.

4. A bicycle wheel according to claim 1, wherein the fastening means is in the form of a plurality of bolts extending from the outside of the boss opposite the flange through the other boss and is screwed into the flange.

5. A bicycle wheel according to claim 1, wherein the disc wheels are linked together by rivets.

* * * * *